United States Patent [19]

Lanier et al.

[11] Patent Number: 4,572,838
[45] Date of Patent: Feb. 25, 1986

[54] METHOD OF RETARDING DENATURATION OF MEAT PRODUCTS

[75] Inventors: Tyre C. Lanier, New Hill, N.C.; Takayuki Akahane, Tokyo, Japan

[73] Assignee: North Carolina State University, Raleigh, N.C.

[21] Appl. No.: 675,145

[22] Filed: Nov. 27, 1984

[51] Int. Cl.⁴ ............................ A23B 4/14; A23L 1/31
[52] U.S. Cl. ..................................... 426/643; 426/646; 426/652
[58] Field of Search ............... 426/643, 646, 641, 658, 426/548, 652

[56] References Cited

U.S. PATENT DOCUMENTS

| | | | |
|---|---|---|---|
| 3,766,165 | 10/1973 | Rennhard | 726/548 X |
| 4,042,714 | 8/1977 | Torres | 426/658 X |
| 4,248,902 | 2/1981 | Eapen et al. | 426/658 X |

FOREIGN PATENT DOCUMENTS

| | | | |
|---|---|---|---|
| 2459618 | 2/1981 | France | 426/643 |

*Primary Examiner*—Arthur L. Corbin
*Attorney, Agent, or Firm*—Bell, Seltzer, Park & Gibson

[57] ABSTRACT

A method of retarding denaturation of muscle protein in meat products during extended storage without materially increasing the caloric content or substantially changing the flavor of the meat product. The method comprises comminuting a meat product containing muscle protein and admixing the comminuted meat product with polydextrose in an amount sufficient to retard denaturation of the muscle protein in the meat product without materially increasing the caloric content or substantially changing the flavor of the meat product.

15 Claims, No Drawings

METHOD OF RETARDING DENATURATION OF MEAT PRODUCTS

FIELD OF THE INVENTION

The present invention is directed towards the use of a chemical additive to prevent the denaturation of food during periods of extended storage.

BACKGROUND OF THE INVENTION

In the food industry, frozen blocks of beef, pork, poultry, fish, shellfish meats and the like are one common form of intermediate or starting material for the manufacture of finely comminuted, thermally set, gel-type products, such as hot dogs, bologna, and simulated shellfish meats. The frozen form of such raw meats allows food processors to be nearer their respective markets, frees them from the concerns of whole animal production, harvesting and processing, and enables inventories of such raw materials to be stockpiled against the possibility of shortages.

A primary quality of such meats intended for use in gel-type products is their ability to form strong gels when comminuted with salt and thermally processed. This gel-forming potential may be referred to as "bind" value and varies as a function of biological factors such as species, muscle type, age of the animal and the like. The native bind potential of any meat can, however, deteriorate as a result of processing and storage of the meat. For example, it is recognized that pre-rigor beef has much higher bind potential than post-rigor beef. Similarly, fresh, properly cleaned and chilled fish also have better gel-forming potential than poorly handled fish. Much of this gel-forming ability can be lost, however, during extended frozen storage, during which muscle protein will denature, i.e. suffer change in its original structure and lose some of its natural desireable qualities.

Maintaining gel-forming potential in meat is presently thought to depend on maintaining the myofibrillar proteins of the muscle tissue as near to the native state as possible. Such maintenance depends on preventing the denaturation of the muscle tissue proteins by the action of heat, microorganisms, enzymes, or extended holding times. Prevention of denaturation requires proper chilling of meats soon after they are slaughtered, rapid processing and freezing, and holding at temperatures as low as are economically feasible.

One type of commercially important frozen meat product for which preserving gel-forming potential is important is surimi, a water washed fish mince used widely in Japan as a precurser for comminuted, gelled fish food products. Basically, surimi comprises a frozen intermediate product produced by carefully and properly filleting fresh fish, mincing, washing and mixing the fish with particular additives, and freezing the mixture in large blocks, after which it can be packed, stored and transported. Surimi is used by Japanese food processors to make a modern version of the traditional Japanese jellied fish cake, "Kamaboko". Kamaboko is a traditional food in Japan, records of which exist from as long as 1500 years ago and which can be made into many varied forms of a final food product. Kamaboko can be steamed, broiled or fried and can be served as meat paste, tubes, balls, noodles, rolls and chipped meat. Of importance with regard to the present invention, the final quality of Kamaboko made from surimi will depend largely on the surimi's quality, making the production and preservation of fish meat in surimi form a major economic consideration in the Japanese food industry.

While proper handling of the minced meat prior to freezing is an important factor in producing high quality surimi and a resulting high quality Kamaboko, it has been known to surimi producers that such proper handling alone is insufficient to prevent denaturation and to maintain the gel-forming potential of the surimi. It has been found, however, that the addition of about 8% by weight of a mixture of sugar (sucrose) and sugar alcohol (sorbitol) followed by fine comminution of the fish meat will preserve the gel-forming properties of the resulting surimi for one year or more in frozen storage ($-20°$ C. or less).

Although the addition of this sucrose-sorbitol mixture is effective as an antidenaturant or "cryoprotective" agent, the relatively large amount required results in an increased caloric content and increased sweetness level in the meat. Although these qualities have become acceptable for Asian consumers, they can be objectionable in products intended for western consumers. Additionally, sucrose can cause a brownish color in a finished fish food product while sorbitol can give the final product a harder, less desirable texture.

Several studies have been made on the effects of various other compounds in preventing the freeze denaturation of frozen fish meat products in attempts to provide acceptable alternatives to the sucrose-sorbitol mixtures. These studies have also focused on the technical aspects of freeze denaturation in an attempt to understand the basic mechanisms by which denaturation takes place.

During these studies, the following compounds and classes of compounds have been tested as antidenaturants for frozen fish food products: sodium glutamate, amino acids, peptides, carboxylic acids, carbohydrates and combinations of various of the listed compounds, along with certain other substances which are generally related to one or more of the listed categories of compounds. None of the compounds studied showed any cryoprotective effects markedly better than the commercially practiced combination of sucrose and sorbitol, and many present problems of cost and side effects given the amounts necessary to prevent denaturation: T. Akahane, *Freeze Denaturation of Fish Muscle Proteins* (1982) (Doctoral Thesis, Sophia University, Tokyo, Japan); S. Noguchi, *The Control of Denaturation of Fish Muscle Proteins During Frozen Storage* (1974) (Doctoral Thesis, Sophia University, Tokyo, Japan).

Heretofore, the antidenaturant characteristics thought best for preventing denaturation included small molecular size and specific molecular structure. When tested for their cyroprotective effects during the aforementioned studies, all compounds having larger more randomly structured molecules showed little or no cryoprotective effect whatsoever.

It is therefore an object of the present invention to provide the food industry with an antidenaturant which will protect food during extended periods of storage, but which will also do so with reduced calorie levels and less sweet taste, making the resulting products more acceptable to western consumers.

SUMMARY OF THE INVENTION

The present invention accomplishes the foregoing object by providing a method of retarding denaturation of muscle protein in meat products without materially increasing their caloric content or substantially changing the flavor of the meat products. This method comprises the steps of comminuting a meat product containing a muscle protein, admixing the comminuted meat product with an antidenaturant in an amount sufficient to retard denaturation of the muscle protein in the meat product. The antidenaturant consists essentially of polydextrose and retards denaturation without materially increasing the caloric content or substantially changing the flavor of the meat product.

DETAILED DESCRIPTION OF THE INVENTION

As used herein, the term "polydextrose" refers to a polysaccharide produced by melting a dry saccharide selected from the group consisting of d-glucose (dextrose) and maltose at a temperature below the point of substantial decomposition of the saccharide and maintaining the molten saccharide at about 140 to 295 degrees Centigrade and at reduced pressure in the presence of a catalytic amount of up to 10 mole percent of a food-acceptable polycarboxylic acid catalyst and in the substantial absence of water until substantial polymerization occurs and simultaneously removing the water formed during the melting and condensation polymerization. Additionally, an acceptable polydextrose will also incorporate between about 5 to 20 percent by weight of a food acceptable polyol, usually sorbitol, with the catalyst in the catalytic step usually being tartaric acid. The resulting polymer is water soluble, highly branched and has an average molecular weight between about 1500 and 1800 and contains from about 0.5 to 5 mole percent of polycarboxylic acid ester. A thorough description of the manufacture, structure and composition of polydextrose is set forth in U.S. Pat. No. 3,766,165 to Rennhard, issued Oct. 16, 1973.

Commercially, polydextrose is available in two forms; an amorphous powder having a residual acidity providing a pH range of 2.5 to 3.5 and a 70% aqueous solution partially neutralized to provide a pH range of 5 to 6. Either form may be used in accordance with the present invention, and the pH may be further adjusted to a more neutral value, e.g. approximately 7, depending on the tolerance of the food product to particular acidities or to changes in acidity.

As is known to those familiar with food preparation, while table sugar (sucrose) provides sweetness and caloric content to foods, in many foods it also provides desirable physical and chemical properties, particularly bulking and texturizing of baked goods and other foods. Where sugar is replaced by an artificial sweetener for caloric purposes, these properties are usually not provided by the artificial sweetener and therefore must be provided by other compounds. Polydextrose was developed to provide these bulking and texturizing properties in artificially sweetened foods. Polydextrose has a caloric utilization in human beings of one calorie per gram, which is 25% that of sucrose and 11% that of certain fats. Polydextrose has been tested and approved by the Food And Drug Administration (FDA) for use in reduced or low calorie foods and is well tolerated in amounts likely to be ingested in foods. In addition, polydextrose causes fewer metabolic side effects than currently used carbohydrates such as sorbitol and mannitol.

We have discovered that the characteristics of antidenaturants heretofore thought best for preventing freeze denaturation—namely small molecular size and specific molecular structure—are not present in polydextrose, which acts as a superior antidenaturant, maintains the original taste of the meat product and adds as little as one-fourth the calories of the compounds presently used commercially, specifically sucrose and sorbitol.

The present invention provides a method of retarding denaturation of muscle protein in frozen meat products without materially increasing the caloric content or substantially changing the flavor of the meat product, and a frozen meat product formed by this method. The method comprises the steps of comminuting a meat product containing a muscle protein, admixing the comminuted meat product with polydextrose in an appropriate amount, and freezing the admixture of the meat product and polydextrose.

In accordance with the present invention, it has been found that the best retardation of denaturation is obtained when the comminuted meat product is admixed with between about 5 and 15% polydextrose by weight with a preferred amount being about 8% polydextrose by weight. Preferably, the admixture of comminuted fish meat and polydextrose is rapidly frozen at temperatures of around minus 35 degrees Centigrade and then stored at temperatures between minus 10 and minus 50 degrees Centigrade. Preferred storage temperatures are between about minus 20 degrees Centigrade and minus 30 degrees Centigrade. It will be understood by those familiar with the food industry that the preferred temperatures at which commercial food products are stored are generally limited by economic and technological feasibility and that while certain freezing temperatures and storage temperatures are disclosed herein, they are not intended as limitations of the scope of the disclosure or of the claims.

The frozen meat product of the present invention comprises an admixture of comminuted muscle protein and polydextrose with the polydextrose being present in an amount sufficient to retard denaturation of the muscle protein without substantially increasing the caloric content or substantially changing the flavor of the meat product. Generally, the frozen meat product will comprise between about 5 and 15% polydextrose by weight with a preferred embodiment comprising about 8% polydextrose by weight.

Because the mechanism of denaturation of muscle protein has certain broad characteristics applicable to several types of meat and fowl as well as fish, it is envisioned that the use of polydextrose as a cryoprotective agent could eventually find wide usage in stabilizing the bind potential of many types of frozen minced meat against deterioration during extended storage. For example, many tons of shrimp from India and other Eastern countries are used annually in the United States for the manufacture of formed shrimp products. The gelling properties of such shrimp have also often been shown to be poor due to denaturation during frozen storage, so much so that many manufacturers of formed shrimp products must add starch or gums as a binding agent. An acceptable cryoprotectant could be incorporated to avoid the heavy glazing of ice presently used to protect this product and the resultant need for the product to be thawed before use.

As another potential application, use of the present invention as a cryoprotectant for the so-called "high-bind" lean meats used in weiner and bologna manufacture could result in even higher bind values for the meats after frozen storage. The invention may be particularly useful for pre-rigor meats, which during frozen storage rapidly lose the degree of bind potential which they possessed when fresh. Thus, in accordance with the present invention, lesser amounts of these more expensive meats could be used in product formulations to achieve product quality which presently must be obtained by increasing the amount of high bind quality meat in the formulation. Accordingly, a greater quantity of meats of lower gel-forming potential, but equal wholesomeness and nutritive value, could be utilized in certain food products resulting in both technological and economic advantages.

Similarly, the present invention may also find use in stabilizing the proteins of mechanically deboned beef, pork and chicken, all of which are presently, or will very likely in the future be, starting materials for the manufacture of gel-type food products.

Additionally, because the mechanisms of denaturation are believed to be the same in dried meat products as they are in frozen meat products, it is believed that the present invention will provide similar antidenaturant protection in dried meat products and that the scope of the present invention extends to dried meat products as well as to frozen meat products.

The foregoing embodiments and examples are to be considered illustrative, rather than restrictive of the invention, and those modifications which come within the meaning and range of equivalence of the claims are to be included therein.

That which is claimed is:

1. A method of retarding denaturation of muscle protein in meat products during extended storage without materially increasing the caloric content or substantially changing the flavor of the meat product, said method comprising the steps of:
   (a) comminuting a meat product containing muscle protein, and
   (b) admixing the comminuted meat product with an anti-denaturant in an amount sufficient to retard denaturation of the muscle protein in the meat product, said anti-denaturant consisting essentially of polydextrose whereby denaturation is retarded without substantially increasing the caloric content or substantially changing the flavor of the meat product.

2. A method according to claim 1 further comprising freezing the admixture of meat product and polydextrose.

3. A method according to claim 2 wherein said admixture of meat product and polydextrose is frozen at a temperature between minus 10 and minus 50 degrees Centigrade.

4. A method according to claim 2 wherein said admixture of meat product and polydextrose is frozen at a temperature between about minus 15 degrees Centigrade and minus 40 degrees Centigrade.

5. A method according to claim 2 wherein said admixture of meat product and polydextrose is frozen at about minus 20 degrees Centigrade.

6. A method according to claim 2 wherein said admixture of meat product and polydextrose is frozen at about minus 30 degrees Centigrade.

7. A method according to claim 1 further comprising drying the admixture of meat product and polydextrose.

8. A method according to claim 1 wherein said meat product comprises fish.

9. A method according to claim 1 wherein said comminuted meat product is admixed with between about five and fifteen percent polydextrose by weight.

10. A method according to claim 1 wherein said comminuted meat product is admixed with less than about eight percent of said polydextrose by weight.

11. A frozen meat product characterized by retarded denaturation during extended storage, a minimum increase in caloric content and retention of original flavor, said frozen meat product comprising a frozen admixture of comminuted muscle protein and polydextrose, said polydextrose being present in an amount sufficient to retard denaturation of said muscle protein without materially increasing the caloric content or substantially changing the flavor of the meat product.

12. A frozen meat product according to claim 11 comprising between about five and fifteen percent polydextrose by weight.

13. A frozen meat product according to claim 11 comprising about eight percent polydextrose by weight.

14. A frozen meat product according to claim 11 comprising less than about eight percent polydextrose by weight.

15. A dried meat product characterized by retarded denaturation during extended storage, a minimum increase in caloric content and retention of original flavor, said dried meat product comprising a dried admixture of comminuted muscle protein and polydextrose, said polydextrose being present in an amount sufficient to retard denaturation of said muscle protein without materially increasing the caloric content or substantially changing the flavor of the meat product.

* * * * *